Sept. 15, 1970  J. F. ZIEVERS ET AL  3,528,555

UNROLLABLE FILTER ELEMENT WITH THROW-AWAY CARTRIDGE

Filed Dec. 11, 1968  2 Sheets-Sheet 1

Inventors
James F. Zievers
Joseph J. Passalaqua
Elmer J. Kulousek
by: Fidler, Bradley & Patnaude
Atty's

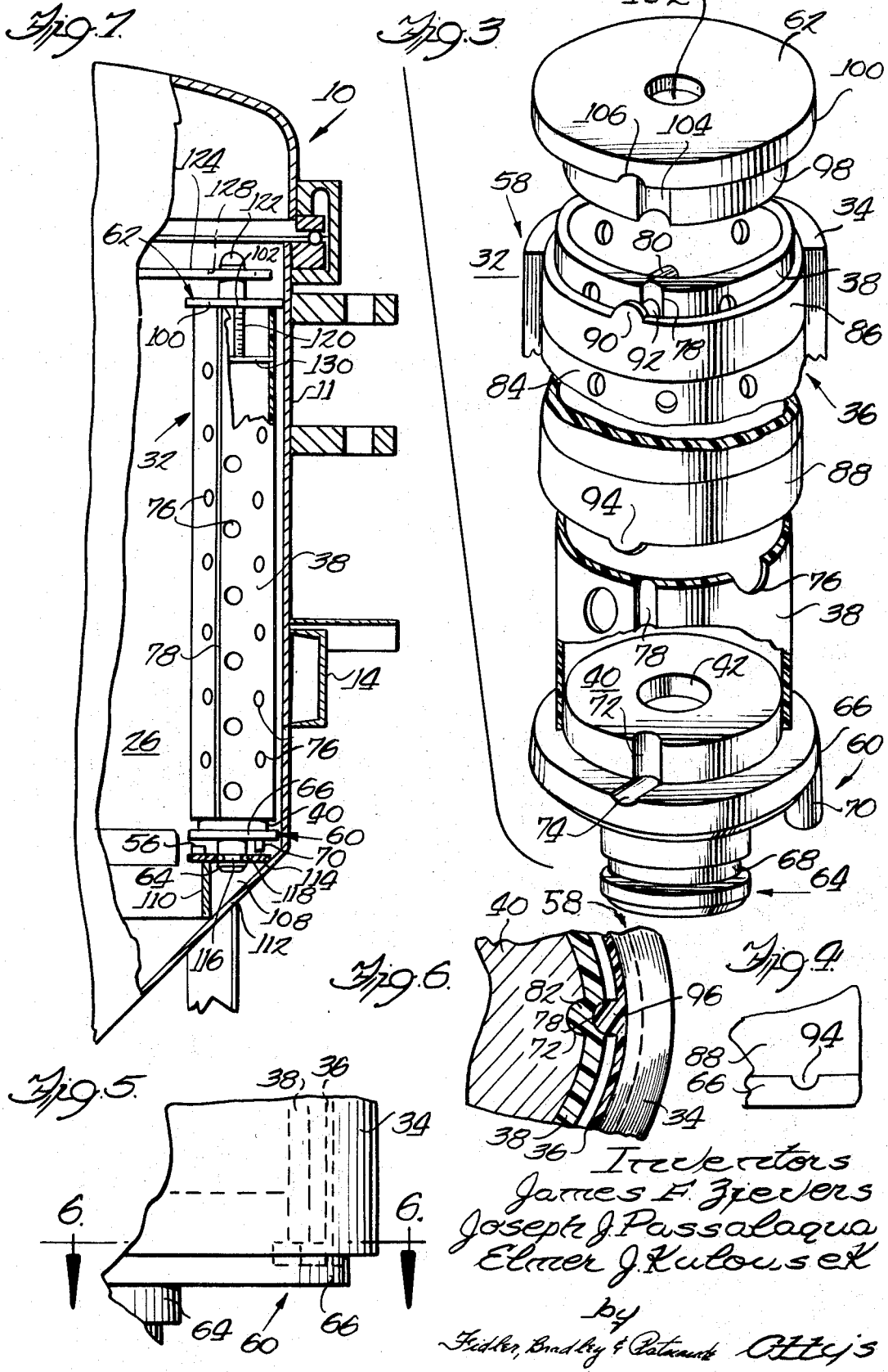

United States Patent Office 3,528,555
Patented Sept. 15, 1970

3,528,555
UNROLLABLE FILTER ELEMENT WITH THROW-AWAY CARTRIDGE
James F. Zievers, La Grange, Joseph J. Passalaqua, Libertyville, and Elmer J. Kulousek, Berwyn, Ill., assignors to Industrial Filter and Pump Mfg. Co., Cicero, Ill., a corporation of Illinois
Filed Dec. 11, 1968, Ser. No. 782,945
Int. Cl. B01d 33/00
U.S. Cl. 210—387                 10 Claims

ABSTRACT OF THE DISCLOSURE

A perforated central tube in the filter element core has two aligning fingers, each extending radially inward from a different end of the tube and has a longitudinally extending aligning groove along its outer surface between the two aligning fingers. The aligning fingers on the ends of the perforated central tube fit into grooves in the plug portions of the top and bottom lock-up plates. The cartridge spool for holding the filter paper includes a perforated middle portion and top and bottom end sealing tubes with each of the top and bottom sealing tubes including a laterally extending tab that fits into one of the grooves in the peripheral flanges of the top and bottom lock-up plates and radially inwardly extending aligning fingers that fit into the longitudinally extending groove in the central tube.

---

This invention relates to filteration apparatuses and more particularly relates to filter elements for use in filteration apparatuses of the type employing a non-woven fabric or paper filtering medium.

Filtering apparatuses are known which include a filter chamber within a tank having a plurality of rolls of filter paper, which rolls are mounted to filter elements within the filter chamber at equal distances from the principal longitudinally axis of the filter chamber. In this type of filtering apparatus, one end of each of the sheets of filter paper in each of the filter rolls is attached to a central spool to be wound thereupon.

In the center of each of the rolls is a filter element core upon which a replaceable cartridge is placed. Each of the replaceable cartridges includes a perforated cartridge spool around which the filter paper is wound. The core of the filter element includes a central tube having perforations over its lateral surface through which the liquid flows after passing through the filter paper wound around the cartridge spool. The core of each filter element communicates with an exhaust manifold into which the liquid that has been filtered flows after passing through the filter paper, the cartridge spool and the perforated central tube.

As a solution is filtered through the filter paper on the cartridges, a cake is built up from the filtered-out solids. When this cake becomes so thick as to reduce the efficiency of the filtering apparatus, the central spool of each of the rolls of filter paper are rotated one revolution to remove the outer layer of filter paper from the filter rolls together with the cake accumulated thereon and thereby to expose a fresh surface of the filter paper to the solution. The last few laps of filter paper upon each of the cartridge spools are securely fastened to these spools and separable from the remainder of the paper so that the remainder of the paper pulls free leaving the last few laps covering the perforated cartridge spool.

In the prior art filtering apparatus, the cake is permitted to continue to build up on the last laps of filter paper after the main portion of the filter paper has been pulled free until the cake is larger than that which normally causes the paper to be unrolled to expose a new surface. When the cake on these last few laps of filter paper becomes so large that the pressure within the exhaust manifold drops below a predetermined limit, an indication is provided to an operator that the exhausted cartridges should be replaced.

It has been proposed to replace the pressure switch used for this purpose with counters that are activated each time the rolls of filter paper make a revolution and which in turn indicate, by a total count of the revolutions of the rolls when only a few laps of filter paper are left on the rolls so that an operator knows that he should replace the exhausted cartridges. It is believed that this type of indicator is less subject to errors then indicators which must rely upon a drop of the pressure in the exhaust manifold.

The prior art filter elements have a disadvantage when they are used in filtering apparatuses that include a counter activated by rotation of the filtering elements to indicate the number of laps of filter paper remaining on the rolls. This disadvantage is that there is a tendency for the cartridge containing the filter paper to slip with respect to the core of the filter element so that the filter paper is unwound from the cartridge but the core does not turn to activate the counter.

Accordingly, it is an object of the invention to provide an improved filtering apparatus.

It is a further object of this invention to provide a novel filter element for use in filtering apparatuses.

It is still a further object of this invention to provide a novel replaceable cartridge for filter elements which cartridge includes a roll of filter paper.

It is still a further object of this invention to provide a filter element in which the spool holding a roll of filter paper is prevented from slipping with respect to the remainder of the filter element.

It is still a further object of this invention to provide a cartridge for filter elements, which cartridge is easily aligned with the core of the filter element when assembled to the core.

In accordance with the above and further objects of the invention, a filter element is provided having a rotatable core with a filter cartridge mounted to it for rotation with it. At least one filter element in a filter unit has a counting cam mounted to it also. The core includes a central tube having perforations over its entire lateral surface, a top lock-up plate, and a bottom nozzle and lock-up plate. The central tube includes a first aligning finger extending radially inward at one of its ends and a second aligning finger extending radially inward at its opposite end in line with the first aligning finger. A groove extends laterally along the outer surface of the central tube in line with both the first and second aligning fingers.

The top lock-up plate includes a cylindrical plug member which fits inside of the central tube and a peripheral flange that rests on top of both the central tube and the cartridge and includes a centrally located aperture. The plug includes a vertical groove extending longitudinally from the adjacent surface of the peripheral flange to the end of the plug and the peripheral flange includes a horizontal groove extending radially outward from the base of the vertical groove in the plug to the end of the flange.

The bottom nozzle and lock-up plate includes a cylindrical plug that fits inside of the central tube and a peripheral flange upon which the central tube and the cartridge rest. On the opposite side of the flange from the plug extends a nozzle and a counting stud. The counting stud lies in a circle having the center of rotation of the filter element as its center and a counter element or switch lies in the same circle for at least one filter element in a filtering unit to be actuated by the counting stud once during a revolution of the filter element. A centrally located aperture extends through the plug, the peripheral flange, and the nozzle to permit the passage of filtered liquid therethrough. A vertical groove extends from the base of the flange longitudinally along the surface of the plug to its edge and a horizontal groove extends radially outward along the surface of the flange from the base of the vertical groove to the edge of the flange.

The cartridge includes a spool having a cylindrical middle portion with perforations across its lateral surface area and two end sealing tubes each including one longitudinally extending tab conforming in size and shape to a cross section of the grooves in the flanges of the top lock-up plate and the bottom nozzle and lock-up plate to close these grooves when the filter element is fully assembled. At the base of each of the longitudinally extending tabs another tab or aligning finger extends radially inward. The filter paper is wound around the cartridge spool.

To compress the top and bottom lock-up plates together a threaded stud passes through the central aperture of the top lock-up plate and into a diametrically extending bar that stretches from one side of the central tube to the other. The threaded stud is screwed downward to force the end sealing tubes of the cartridge securely against the bottom nozzle and lock-up plate and the top lock-up plate to form a liquid tight seal therewith.

When a cartridge is to be replaced, the threaded stud is unscrewed and the top lock-up plate is removed. The cartridge is then slid upward and discarded. The bottom inwardly extending aligning finger of a new cartridge is inserted in the longitudinally extending groove of the central tube and the new cartridge is slid downward over the central tube with both aligning fingers of the new cartridge projecting into the longitudinally extending groove of the central tube and with the bottom longitudinally extending end tab closing the horizontal groove of the bottom nozzle and lock-up plate. The top lock-up plate is then positioned over the new cartridge with its vertical groove in its plug being positioned around the top aligning finger of the central tube and its horizontal groove in its flange being positioned around the top longitudinally extending tab of the cartridge spool. The threaded stud is then inserted through the central aperture in the top lock-up plate to compress the sealing tubes and their longitudinally extending tabs against the flanges of the top and bottom lock-up plates forming a liquid tight seal therewith.

The bottom longitudinally extending tab on the cartridge insures that the cartridge always rotates with the bottom nozzle and lock-up plate. Because the cartridge always rotates with the bottom nozzle and lock-up plate, the counting stud on the bottom nozzle and lock-up plate always rotates each time a lap of the filter paper is removed from the cartridge to properly activate the counter so that it accurately indicates the number of laps of paper unrolled and therefore the number of laps of paper remaining on the cartridge.

The invention and the above noted and other features thereof will be better understood from the following detailed description when considered with reference to the accompanying drawings in which:

FIG. 3 is an exploded perspective view of a filter element partially broken away in accordance with an embodiment of the invention;

FIG. 4 is a fragmentary elevational view of a filter element in accordance with an embodiment of the invention;

FIG. 5 is a fragmentary elevational view of a filter element from another angle in accordance with an embodiment of the invention;

FIG. 6 is a plan fragmentary sectional view of a portion of a filter element in accordance with an embodiment of the invention; and FIG. 7 is a fragmentary elevational view of the filtering unit of FIG. 1 broken away to show a filter element in accordance with an embodiment of the invention.

FILTERING APPARATUS

Figure 1:
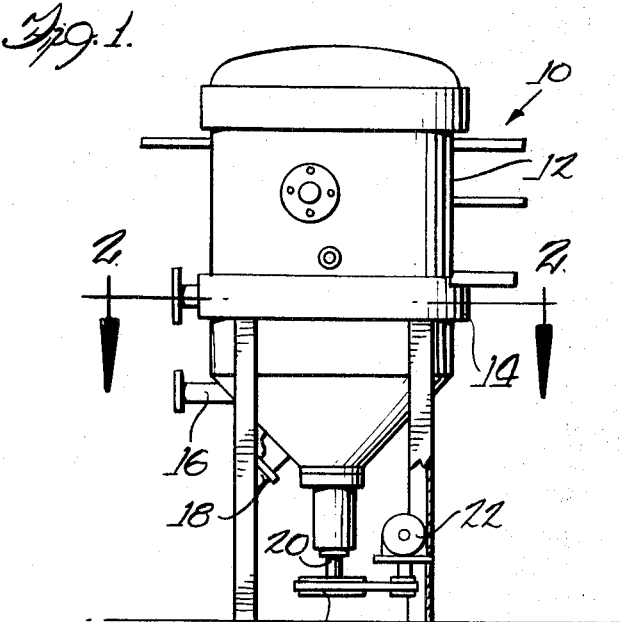
FIG. 1 is an elevational view of a filtering unit which incorporates an embodiment of the invention.

In FIG. 1 a filtering unit 1 is shown having a generally cylindrical tank 12 and an inlet manifold 14 circumscribing the tank 12 through which liquids to be filtered are pumped into the tank 12. An exhaust duct 16 extends from the tank 11 beneath the inlet manifold 14 and communicates with an exhaust manifold 108 (FIG. 7) for receiving the filtered liquids. A drain 18 extends from a lower portion of the tank 12 to permit removal of waste material from the filtering unit 10. A drive shaft 20 extends along the longitudinal axis of the filtering unit 10 and is driven by motor 22 through the belt drive 24. The drive shaft 20 periodically operates a mechanism for removing a lap of exhausted filter paper from the circumference of rolls of filter paper wound around filter elements in the filtering unit 10 to expose a new surface of the filter paper to the liquid being filtered in a manner to be hereinafter explained.

Figure 2:
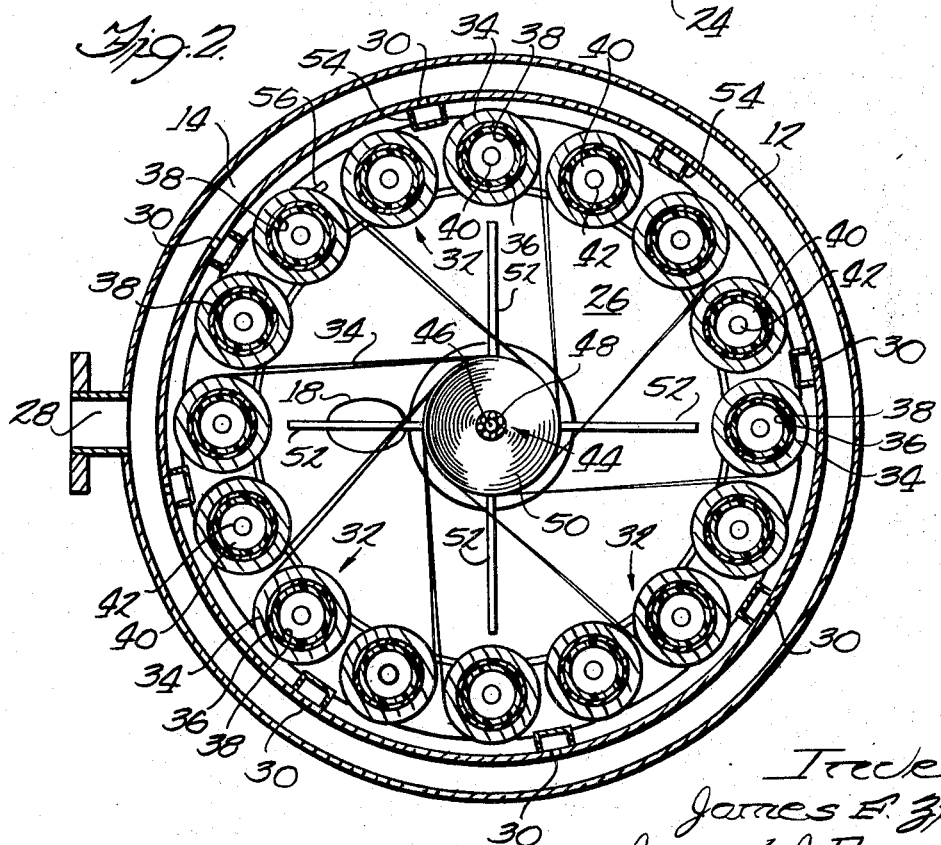
FIG. 2 is a sectional view taken along lines 2—2 of FIG. 1.

In FIG. 2 the inlet manifold 14, the tank 12, and a filter chamber 26 are shown in a plan sectional view taken through lines 2—2 of FIG. 1. The solution to be filtered enters the inlet manifold 14 through the inlet duct 28. The inlet manifold 14 circumscribes the tank 12 and includes a plurality of circumferentially spaced apertures 30 through which the liquid to be filtered flows into the filter chamber 26.

A plurality of filter elements 32 are arranged near the inner wall of the filter chamber 26 in a circle, with each filter element having its longitudinal axis parallel to the longitudinal axis of the tank 11 and an equal distance therefrom. Each of the filter elements 32 includes a roll of filter paper 34 wound in several laps around a perforated filter cartridge spool 36 which is in turn positioned coaxially around a perforated central tube 38. At the bottom of the perforated central tube 38 is a cylindrical plug 40 forming a part of a bottom nozzle and lock-up plate. The bottom nozzle and lock-up plate has a central aperture 42 which serves as an outlet for the filtered liquid.

Along the longitudinal axis of the tank 11, extends a take-up spool 44 which includes a rotatable central spindle 46 and a cage 48 including a plurality of bars. One end of each of the sheets of filter paper 34 in the filter elements 32 is attached to the rotatable spindle 46 by the bars in the cage 48. The take-up spool 44 is rotated by the drive shaft 20 to incrementally wind the sheets of filter paper 34 about it taking one lap from the filter elements 32 at a time as the cake on the filter elements becomes too large and forming a roll 50 of exhausted filter paper about the rotatable spindle 46. A spider including the four spider arms 52 is mounted to the take-up spool 44 and supports it.

To prevent the liquid being filtered from impinging directly upon the filter elements 32 as it passes through the apertures 30 from the inlet manifold 14, a plurality of channel-like baffles 54 are spaced about the inner walls of the tank 11 within the filter chamber 26 with one of the baffles 54 being positioned in line with each of the apertures 30.

A counter element or switch 56 is positioned adjacent to at least one of the filter elements 32 in a circle having the center of rotation of the filter element as its center and having a counting stud of a filter element along its circumference to register a count each time the filter element 32 is rotated.

Each of the filter spools 36 and the paper 34 form a unitary cartridge 58 (FIGS. 3 and 6) which is positioned over the perforated central tube 38 to complete each of the filter elements. The ends of the sheet of filter paper 34 are then attached to the cage 48 of the take-up spool 44.

In operation, the liquid to be filtered enters the inlet duct 28 and flows into the annular inlet manifold 14. From the inlet manifold 14, the liquid to be filtered flows through the circumferentially spaced apertures 30 in the wall of the tank 12 into the channel-like baffles 54 within the filter chamber 26. The liquid to be filtered flows from the baffles 54 into the chamber 26 and through the sheets of filter paper 34 on the filter elements 32. The particles to be filtered out of the liquid are deposited upon the outer lap of the sheets of filter paper 34 and the filtered liquid passes through the roll of filter paper, the perforated take-up spool 36 and the perforated central tube 38 in the filter chamber 26 and then leaves the filter chamber 26 by way of the outlet apertures 42 of the filter elements 32.

When the cake of filtered material deposited about the outer layer of filter paper becomes so large the efficiency of the filter element is impaired, the pressure in the exhaust manifold drops, actuating a pressure switch (not shown) and, as a result, the take-up spool 44 is rotated to unroll one lap of filter paper 34 from each of the filter elements 32 and to wind a corresponding length of filter paper onto the roll of exhausted filter paper 50. This winding action removes the outer lap of the filter paper 34 from each of the elements 32 to expose a clean surface. The rotation of the filter elements 32 in the unrolling process moves an arm against the counter member 56 to activate a counter that counts the revolution and to indicate that no further filter paper should be unrolled when only a few laps are left on the filter element spools 36.

After the filter paper 34 has been exhausted from the filter elements 32 with the exception of a few laps that are attached to the filter spools 36, the counter activated by the counter elements 56 provides an indication to the operator that the cartridges 58 on the filter elements 32 are to be changed. The last few laps of the filter paper 34 are fastened to the perforated filter spool 36 so that the filter paper 34 is pulled free from the cartridges 58 by the continued winding of the take-up spool 44 leaving only those laps that are securely fastened to the perforated filter spool 36.

When the exhausted filter paper other than that firmly secured around the cartridge spools 36 has been all wound into the roll 50, the take-up spool 44 and the roll of exhausted filter paper 50 are lifted from the filter chamber by the spider arms 52. The exhausted filter paper and the accumulated filter cake upon it are removed from the take-up spool 44 and the spool is replaced. Similarly, each of the cartridges 58 are removed from the perforated central tubes 38 of each of the filter elements 32. A new cartridge 58 with a complete roll of filter paper 34 upon it is then positioned over each of the perforated central tubes 38 and the ends of the paper 34 are attached to the cage 48 of the take-up spool 44 to start a new cycle.

FILTER ELEMENT

In FIG. 3 a filter element 32 is shown in an exploded perspective view, partially broken away, having a bottom nozzle and lock-up plate 60, a central tube 38, a cartridge 58, and a top lock-up plate 62. The central tube 38 and the cartridge 58 are mounted between the bottom nozzle and lock-up plate 60 and the top lock-up plate 62 with the cartridge 58 coaxially surrounding the central tube 38.

The bottom nozzle and lock-up plate 60 includes a central cylindrical flange 66, a nozzle portion 64 beneath the flange 66 having an annular groove 68 in its periphery and a cylindrical plug 40 above the flange 66. The central aperture 42 passes through the top plug 40, the central flange 66, and the nozzle 64 to provide an outlet for liquid within the central tube 38. The annular groove 68 in the nozzle is adapted to receive a bearing and a O-ring to permit the filter element 32 to be rotatably mounted within the chamber 26 with a sealing relationship to the bottom of the chamber. A counting stud 70 depends from the flange 66 and serves to activate the counting elements 56 (FIG. 2).

The lateral surface of the plug 40 includes a vertical groove 72 extending from its top surface down to the top surface of the flange 66. The top surface of the flange 66 includes a horizontal groove 74 that intersects with the groove 72 and extends radially to the edge of the top surface of the flange 66.

The central perforated tube 38 includes a plurality of apertures 76 extending through its wall at locations spread across its entire lateral surface area and a longitudinally extending aligning groove 78 extending from its top edge to its bottom edge. At the top end of the perforated central tube 38, an aligning finger 80 extends radially inward from a location adjacent to the top end of the groove 78 and is aligned therewith. Similarly, at the bottom end of the central tube 78 a second aligning finger 82 (FIG. 6) extends radially inward at a location adjacent to the bottom end of the groove 78 and fits into the vertical groove 72 in the plug 40.

The central tube 38 is assembled with its walls abutting and circumscribing the plug 40 of the bottom nozzle and lock-up plate 60 and with its lower aligning finger 82 extending into the groove 72 of the plug 40 so that the groove 78 in the central tube 38 is aligned with the horizontal groove 74 in the flange 66 of the bottom nozzle and lock-up plate 60. The central tube 38 is a permanent part of the core of the filter element 32 and is fastened in place by screws through the plug 40 or by bonding its inner wall thereto.

The cartridge 58 includes the filter cartridge spool 36 with the roll of filter paper 34 wound thereon. A few wraps of the filter paper 34 are wound around and permanently fastened to the cartridge spool 36 and the remainder of the wraps are free to unroll from the spool 36.

The filter cartridge spool 36 includes a middle perforated tube 84, a first end sealing tube portion 86 extending coaxially from one end of the middle perforated tube 84, and a second end sealing tube 88 extending coaxially from the other end of the perforated tube 84. The first sealing tube 86 includes a longitudinally extending tab 90 at its outer end and a radially extending aligning finger 92 extending at a location adjacent to the longitudinally extending tab 90 and being orthogonal thereto. Similarly the second sealing tube 88 includes a longitudinally extending tab 94 and a radially extending aligning finger 96. The radially extending aligning finger 96 fits into the longitudinal groove 78 in the central tube 38 and serves to align the cartridge 58 with the central tube 38 when it is being assembled thereto. The longitudinally extending tab 94 is shaped to conform to the groove 74 and fits therein to form a sealing relation with the flange 66 of the bottom nozzle and lock-up plate 60. The tab 94 also locks the cartridge with the bottom nozzle and lock-up plate 60 so that the cartridge must turn with the bottom nozzle and lock-up plate and cannot slide with respect to it as best shown in FIGS. 4, 5 and 6.

The top lock-up plate 62 includes a cylindrical plug 98 of sufficient size to fit snugly within the inner walls of the central tube 38 and a cylindrical flange 100. A central aperture 102 passes through the center of the flange 100 and the disc 98 to communicate with the inside of the central tube 38.

The disc 98 includes a vertical groove 104 extending from the flange 100 to the edge of the plug 98. The flange 100 includes a horizontal groove 106 extending radially along its bottom surface from a junction with the groove 104 to the edge of the flange. The groove 104 is shaped to accommodate the radially extending aligning finger 80 within the perforated tube 38 and the groove 106 is shaped to conform to the longitudinally extending tab 90 of the sealing ring 80 of the cartridge spool 36.

To place the top lock-up plate 62 over the filter element 32, the groove 104 in the plug 98 is aligned with the aligning finger 80 of the perforated central tube 38. When the plug 98 is properly aligned, the tab 90 of the end sealing tube 86 completely closes the groove 106 to form a seal therewith.

When the filter element 32 is fully assembled, the cartridge spool 36 and a portion of the roll of paper 34 rest upon the flange 66 of the bottom nozzle and lock-up plate 60 as best shown in FIG. 5. The sealing tube 88 of the cartridge spool 36 is pressed against the flange 66 with the tab 94 within the groove 74 to form a liquid seal therewith. The central tube 38 is fastened to the plug 40 inside of the cartridge 58.

In FIG. 7 a filter element 32, without the cartridge 58, is shown mounted to a filtering unit 10 in a fragmentary partially broken away view. This view illustrates the mechanism for mounting the filter units 32 within the tank 11.

To withdraw the filtered liquid from the filter element 32, the tank 11 includes an exhaust manifold 108 formed by a vertical cylindrical plate 110 extending around the inside of the tank 11 and abutting at its lower end a funnel-shaped portion 112 of the tank 11 and by an annular plate 114 abutting the top end of the plate 110 at one end and the inner wall of the tank at its other end to define the annular exhaust manifold 108 between the wall of the tank, the plate 114 and the plate 110. The annular exhaust manifold 108 communicates with the exhaust duct 16 (FIG. 1).

The counting member 56 is positioned under the flange 66 in a circle with the counter stud 70 about the axis of rotation of the filter element to be activated thereby as the filter element 32 rotates.

The horizontal annular plate 114 includes an aperture 116 for each filter element, which aperture is adapted to receive the groove 68 in the nozzle 64 of the filter element. A sleeve bearing 118 and an O-ring form a rotatable sealing relationship between the nozzle 64 and the plate 114.

To support the filter elements, the central aperture 102 in the top lock-up plate 62 receives a threaded portion 120 of a stud 122. An annular mounting plate 124 includes an aperture for each filter element 32 and one of a plurality of sleeve bushings 128 fits in each aperture and around one of the studs 122 so that the annular mounting plate 124 supports each of the filter elements 32 by means of a stud 122.

To compress the ends of the sealing tubes 86 and 88 of the cartridge spool 36 against the flanges 100 and 66 respectively, the threaded portion 120 of the stud 122 engages a tapped bore in a cross bar 130, which cross bar has its ends inserted within diametrically opposed apertures in the central tube 38. By tightening the threaded portion 20 of the stud 122 within the cross bar 130 the flange 100 is caused to press down upon the spool 36 to cause a sealing fit to be made between the sealing rings 86 and 88 and the flanges 100 and 66.

ASSEMBLY AND REPLACEMENT OF CARTRIDGES

To replace the cartridges 58 on the filter elements 32 within the tank 26 after they have been exhausted, the annular mounting plate 124 is first removed. The threaded stud 122 is then unscrewed and the top lock-up plate 62 removed from each of the filter elements 32. The cartridge 58 is then slid upward off of the central tube 38 and discarded.

To place a new cartridge having unused filter paper 34 onto the core of the filter element 32, the cartridge 58 with a roll of unused filter paper on it is positioned over the central tube 38 with its bottom inwardly extending aligning finger 96 extending into the groove 78 in the perforated tube 38. The cartridge is then moved downward until the bottom tab 94 of the sealing tube 88 engages within the horizontal groove 74 in the flange 66 of the bottom nozzle and lock-up plate 60. The top lock-up plate 62 is then positioned over the cartridge 58 with the groove 104 over the aligning finger 80 of the central tube 38 and with the groove 106 engaged around the longitudinally extending tab 90 of the sealing tube 86. The threaded stud 122 is inserted into the aperture 102 of the top lock-up plate and threaded into the cross bar 130 to compress the sealing tubes 86 and 88 between the flanges 100 and 66 forming a liquid tight seal therewith. The annular mounting ring 124 is now positioned about the studs 122 for each of the filter elements 32.

It can be understood that the filter cartridge 58 cannot slip with respect to the counting studs 70 on the bottom nozzle and lock-up plate 60 and therefore the counter actuated by the counting stud 56 maintains an accurate count of the laps of paper of 34 that have been unwound from the cartridge 58. Moreover, the longitudinally extending tab on the cartridge 58 that prevents this slipping is easily aligned with the groove 74 in the flange 66 when assembled with the aid of the aligning fingers of the cartridge and the groove in the central tube 38.

Although a specific embodiment of the invention has been described with a certain particularity, many variations and modifications of the specific embodiment may be made without deviating from the invention. Accordingly, it is to be understood that, within the scope of the appended claims, the invention may be practiced otherwise than as specifically describel.

What is claimed is:

1. A cartridge for a filter element comprising:
   a perforated spool;
   a roll of filter medium wound around said perforated spool; and
   a tab extending longitudinally from one end of said spool.

2. The cartridge of claim 1 in which said perforated spool inclues a sealing tube and a perforated tube, said sealing tube extending coaxially from the perforated tube and said tab extending from the end of the sealing tube.

3. A cartridge according to claim 2 further including an aligning finger extending radially inward from said sealing tube adjacent to said longitudinally extending tab.

4. A cartridge according to claim 3 in which said roll of filter medium includes at least one lap of filter medium the inner surface of which is fastened firmly to said spool.

5. A cartridge according to claim 4 in which said spool further includes a second sealing tube extending coaxially from the opposite side of said perforated tube from said first-mentioned sealing tube, said second sealing tube including a longitudinally extending tab aligned with the tab on said first sealing tube and a radially inwardly extending aligning finger adjacent to said tab on said second sealing tube.

6. A filter element including in combination, the cartridge of claim 1 and a filter element core, said filter element core comprising:
   a perforated central tube;
   a bottom nozzle and lock-up plate secured to said central tube;
   said bottom nozzle and lock-up plate having a central aperture extending coaxially with said central tube; and
   a top lock-up plate removably fastened to the top of said central tube, said cartridge being positioned around and coaxially with sail central tube.

7. The filter element of claim 6 in which:
   said bottom nozzle and lock-up plate includes an opening and said spool includes a perforated tube and a sealing tube;
   said sealing tube being coaxial with and extending from the perforated tube and including said longitudinally extending tab;

said tab being positioned in sealing relationship with said opening.

8. The combination of claim 7 in which said central tube has a longitudinally extending groove aligned with said opening in said bottom nozzle and lock-up plate and said sealing tube has an radially inwardly extending aligning finger inserted within said longitudinally extending groove.

9. The combination of claim 8 in which:
said bottom nozzle and lock-up plate includes a second opening orthogonal to said first-mentioned opening;
said central tube includes a radially inwardly extending aligning finger fitted within said second opening;
said core further comprising a threaded mounting means rigidly connected to said central tube;
said top lock-up plate including an aperture;
said filter element further including a threaded stud having a flange larger than said aperture and resting upon the top of said top lock-up plate; and
said threaded stud having a threaded portion extending through said central aperture and engaging said threaded mounting means, whereby said top lock-up means and bottom lock-up means are compressed together.

10. A filter element according to claim 9 in which said bottom nozzle and lock-up plate includes a bearing surface for rotatably mounting said filter element and a counting stud for activating a counter as said filter element rotates.

References Cited

UNITED STATES PATENTS 3,224,587  12/1965  Schmidt _____ 210—387 X

REUBEN FRIEDMAN, Primary Examiner

F. A. SPEAR, Jr., Assistant Examiner

U.S. Cl. X.R.

210—494